Patented Nov. 22, 1938

2,137,820

UNITED STATES PATENT OFFICE 2,137,820

PURIFICATION OF MERCAPTO ARYL THIAZOLES

Ira Williams and Bernard M. Sturgis, Woodstown, N. J., assignors to E. I. du Pont de Nemours & Company, Wilmington Del., a corporation of Delaware No Drawing. Application July 8, 1937, Serial No. 152,538

14 Claims. (Cl. 260—306)

This invention relates to the preparation of mercapto aryl thiazoles and more particularly to a method of purifying mercapto aryl thiazoles, which method removes the tarry matter and odor.

Mercapto benzo thiazole is usually prepared by heating aniline, carbon disulfide and sulfur together at a temperature in excess of 200° C. Other similar methods are known, such for example as heating anhydro formaldehyde aniline with sulfur at a temperature of about 200° C. or higher. Other mercapto aryl thiazoles are prepared in a similar manner, substituting other amines for the aniline. In every case it is necessary to maintain a high pressure of hydrogen sulfide during the reaction to retard the decomposition of the mercapto aryl thiazole with the resulting formation of impurities which are of a tarry nature. In spite of this atmosphere of hydrogen sulfide, some of the mercapto aryl thiazole decomposes and the resulting product contains considerable amounts of impurities of a tarry nature which are difficult to remove.

The usual method of purifying mercapto aryl thiazoles, as so produced, has heretofore consisted in treating the crude product with caustic soda, filtering off the undissolved material and precipitating the dissolved mercapto aryl thiazole by the addition of acid. This treatment does not completely eliminate the tarry materials which are, to a large extent, soluble in caustic. Accordingly, the resulting thiazole is yellow or brown in color and has an offensive odor. The pure material, which is white or only slightly colored and has almost no odor, can be obtained by crystallization from other solvents, but the use of such other solvents is economically impractical.

It has been proposed to purify crude mercapto aryl thiazoles by the use of alkali carbonates at various temperatures. However, these carbonates have been used in large excess and, as so used, dissolve a large percent of the impurities, so that this method has not met with any material success. It has also been proposed to employ ammonium hydroxide. While this is superior to the alkali hydroxides and carbonates, a large excess of the ammonium hydroxide must be employed to hold the thiazole in solution and this excess causes the solution of a considerable portion of the impurities and the resulting product is relatively impure.

It is an object of the present invention to provide an improved method of purifying crude mercapto aryl thiazoles whereby substantially pure products may be produced. Another object is to provide an improved method of producing solutions of relatively pure alkali metal salts of mercapto aryl thiazoles, which solutions are substantially free from tarry materials. A further object is to produce mercapto aryl thiazoles in substantially pure form which are substantially free of tarry materials and odor. Still further objects are to advance the art. Other objects will appear hereinafter.

These objects may be accomplished in accordance with our invention which comprises treating the crude mercapto aryl triazoles with hot aqueous solutions containing from about 1 to about 1.5 equivalents of an alkali metal salt selected from the bicarbonates and the carbonates or, in other words, the alkali metal bicarbonates and the alkali metal carbonates, until substantially all of the mercapto aryl thiazole is dissolved, and then separating the undissolved material from the solution. We have found that by employing such amounts of the bicarbonates and carbonates, it is possible to dissolve the mercapto aryl thiazoles with the elimination of practically all of the foreign material which remains undissolved and can be removed by filtration. The resulting solution comprises an aqueous solution of substantially pure alkali metal salt of the mercapto aryl thiazole, which solution is substantially free of tarry materials and the like. The free mercapto aryl thiazoles can be obtained from such solutions by precipitation with acid, whereupon the mercapto aryl thiazoles are recovered in practically pure form and substantially free of tarry materials and odor. The mercapto aryl thiazoles thus produced are only slightly colored, almost odorless, and have melting points several degrees above those obtained from the same crude materials by means of alkali hydroxides or carbonates, employed as has been heretofore suggested.

The action of sodium bicarbonate on the mercapto aryl thiazole can be represented by the following equation:

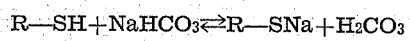

$$R\text{—}SH + NaHCO_3 \rightleftarrows R\text{—}SNa + H_2CO_3$$

in which R represents an arylene thiazyl radical such as benzothiazyl. At ordinary room temperature, this reaction is largely directed toward the left, with the result that the mercapto aryl thiazole is not readily soluble. The equilibrium is disturbed at higher temperatures by the decomposition of the carbonic acid. By the elimination of the resulting carbon dioxide, all the mercapto aryl triazole can be brought into solution. However, care must be taken that not more than about 1.5 equivalents of the bicarbonate is employed, as any substantial excess over such amount will cause solution of the tarry materials, which is objectionable.

The action of sodium carbonate on mercapto aryl thiazole can be represented by the following equations:

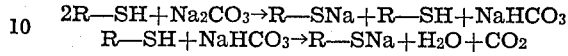

$$2R\text{—}SH + Na_2CO_3 \rightarrow R\text{—}SNa + R\text{—}SH + NaHCO_3$$
$$R\text{—}SH + NaHCO_3 \rightarrow R\text{—}SNa + H_2O + CO_2$$

Since 1 mole of sodium carbonate is equivalent to 2 moles of sodium bicarbonate, much smaller amounts of sodium carbonate must be employed. In other words, 0.5 mole of sodium carbonate is equivalent to 1 mole of sodium bicarbonate, and 1.5 equivalent of sodium carbonate would equal 0.75 mole. It will be noted that, even with sodium carbonate, the solution is completed with bicarbonate. Under ordinary conditions and where the crude mercapto aryl thiazole is relatively pure, sodium carbonate can be used as indicated. However, in extreme cases where the mercapto aryl thiazole is extremely impure, it will generally be advisable to replace at least part of the carbonate with bicarbonate.

The amount of bicarbonate or of carbonate employed will depend on the amount of impurities and the relative reactivity of the impurity and the thiazole. As much as 1.5 equivalent of the bicarbonate or carbonate will, in general, produce a fairly satisfactory result. However, it is generally preferred to employ from about 1 to about 1.4 equivalent of the carbonate or bicarbonate based on the mercapto aryl thiazole in the crude product. It will be understood that when we use the term "equivalent" herein and in the claims, we mean the amount theoretically necessary for reacting with the mercapto aryl thiazole in the product being treated or, in other words, the combining proportion or weight. The amount of water employed will at least be sufficient to completely dissolve the alkali salt of the mercapto arylene thiazole.

In order to more clearly illustrate our invention, the preferred modes of carrying the same into effect, and the advantageous results to be obtained thereby, the following examples are given:

*Example 1*

Crude mercapto benzo thiazole was prepared by the reaction of aniline, carbon disulfide and sulfur. The product was a dark brown pasty mass and was known to contain only very small amounts of dissolved and trapped hydrogen sulfide and approximately 80 percent of mercapto benzo thiazole. 208 grams of the crude product were added to 84 grams of sodium bicarbonate (1 equivalent based on the mercapto benzo thiazole) dissolved in 3.4 liters of water and the mixture was boiled with stirring for about 15 minutes. Dilute hydrochloric acid was then added until the solution was just neutral to phenolphthalein. The solution was then filtered while hot and precipitated with dilute hydrochloric acid. When dry, the precipitate weighed 162 grams, was very pale yellow in color, almost odorless and melted at 170–175 C.

*Example 2*

An experiment was conducted as in Example 1 except that the solution was heated with stirring at a temperature of about 60° C. for five hours. The results were similar to those obtained in Example 1.

*Example 3*

210 grams of crude mercapto benzo thiazole prepared by heating anhydro formaldehyde aniline with sulfur were added to a solution of 53 grams of sodium carbonate (1 equivalent or 0.5 mole based on the mercapto benzo thiazole) in 2.0 liters of water. The solution was stirred and heated at boiling temperature for about 20 minutes. The solution was made neutral to phenolphthalein by the addition of dilute hydrochloric acid, after which it was filtered from the undissolved tarry residue and the filtrate treated with hydrochloric acid. The resulting mercapto benzo thiazole weighed 166 grams, was very pale yellow, almost odorless and melted at 172–176° C.

*Example 4*

20 grams of crude mercapto benzo thiazole prepared from anhydro formaldehyde aniline were placed in 150 cc. of water and 6.5 grams of anhydrous sodium carbonate (1.02 equivalent assuming the crude mercapto benzo thiazole to be 100% pure) were added. The mixture was stirred and heated to boiling for 15 minutes. The solution was then filtered and precipitated while hot by the addition of hydrochloric acid until the solution was acid to litmus. The dried precipitate weighed 15.5 grams, was pale yellow, almost odorless and melted at 170–175° C., while the product which resulted from extraction with sodium hydroxide was a dark tan color, had an unpleasant odor and melted at 161–165° C. The sodium carbonate amounted to 1.32 equivalent based on the mercapto benzo thiazole recovered.

*Example 5*

62 grams of crude 6-ethoxy 2-mercapto benzo thiazole prepared from carbon disulfide, sulfur and p-phenetidine were added to 15.5 grams of sodium carbonate in 400 cc. of water. The solution was stirred and heated to boiling for one hour. The solution was filtered hot and the filtrate acidified with 6 normal hydrochloric acid. 47 grams of pale yellow, practically odorless product were obtained which melted at 193–196° C. The sodium carbonate used was 0.5 mole or 1 equivalent based on the crude thiazole but was about 1.30 equivalent based on the thiazole recovered.

*Example 6*

50 grams of crude 6-methyl 2-mercapto benzo thiazole were treated in 400 cc. of water with 14.6 grams of sodium carbonate. This is 0.5 mole or 1 equivalent of sodium carbonate based on the thiazole, assuming that the crude thiazole contains no impurities. The solution was stirred and boiled for one hour, filtered and precipitated with hydrochloric acid. A pale yellow product melting at 174–178° C. was obtained. The yield was 35 grams or 70% of theory. The amount of sodium carbonate employed, based on pure thiazole, was then 0.71 mole or 1.42 equivalent.

*Example 7*

208 grams of crude mercapto benzo thiazole were treated in 3 liters of boiling water with 100 grams of potassium bicarbonate. The solution was filtered and precipitated with dilute sulfuric acid. The resulting product was very pale yellow, almost odorless and melted at 171–176° C. The amount of potassium bicarbonate was 1 equivalent based on the crude mercapto benzo thiazole being approximately 80 percent pure.

While the above examples illustrate the results to be obtained with some representative mercapto aryl thiazoles, it will be readily apparent that this same method can be applied to the purification of other mercapto aryl thiazoles such as those prepared from alpha naphthylamine, beta naphthylamine, the xylidines, the amino diphenyls, the alkoxy anilines and similar aromatic amines, by treatment with carbon disulfide and sulfur, formaldehyde and sulfur, or similar methods. The term "mercapto aryl thiazole" as employed herein and in the claims is to be considered to be generic to such thiazoles, even though the aromatic ring contains non-hydrocarbon substituents.

The temperature at which the solution can be carried out may be varied within rather wide limits. However, the speed of solution is generally quite slow below 50° C. Accordingly higher temperatures, usually from about 60° C. to the boiling point of the solution, will be employed. The best results will be obtained at about the boiling temperature and we therefore preferably carry out the solution at about such boiling temperature.

By the phrase 2-mercapto arylene thiazoles of the benzene and naphthalene series as hereinafter employed in the claims, we mean 2-mercapto benzo thiazoles containing only one benzene ring and 2-mercapto naphtho thiazoles containing only two fused benzene rings, respectively.

While we have disclosed the preferred embodiments of our invention, the preferred modes of carrying the same into effect and the advantageous results to be obtained thereby, it will be readily apparent to those skilled in the art that many variations and modifications may be made therein without departing from the spirit of our invention. Accordingly, the scope of our invention is to be limited solely by the appended claims construed as broadly as is permissible in view of the prior art.

We claim:

1. The method of purifying crude 2-mercapto arylene thiazoles of the benzene and naphthalene series containing tarry materials which comprises treating the crude 2-mercapto arylene thiazole with a hot aqueous solution containing from about 1 to about 1.5 equivalents of an alkali metal salt selected from the bicarbonates and the carbonates until substantially all of the mercapto arylene thiazole is dissolved, and separating the undissolved material from the solution.

2. The method of purifying crude 2-mercapto arylene thiazoles of the benzene and naphthalene series containing tarry materials which comprises treating the crude 2-mercapto arylene thiazole with a hot aqueous solution containing from about 1 to about 1.5 equivalents of an alkali metal salt selected from the bicarbonates and the carbonates, boiling the mixture until substantially all of the 2-mercapto arylene thiazole is dissolved, and separating the undissolved material from the solution.

3. The method of purifying crude 2-mercapto arylene thiazoles of the benzene and naphthalene series containing tarry materials which comprises treating the crude 2-mercapto arylene thiazole with a hot aqueous solution containing from about 1 to about 1.5 equivalents of an alkali metal bicarbonate until substantially all of the 2-mercapto arylene thiazole is dissolved, and separating the undissolved material from the solution.

4. The method of purifying crude 2-mercapto arylene thiazoles of the benzene and naphthalene series containing tarry materials which comprises treating the crude 2-mercapto arylene thiazole with a hot aqueous solution containing from about 1 to about 1.5 equivalents of an alkali metal bicarbonate, boiling the mixture until substantially all of the 2-mercapto arylene thiazole is dissolved, and separating the undissolved material from the solution.

5. The method of purifying crude 2-mercapto arylene thiazoles of the benzene and naphthalene series containing tarry materials which comprises treating the crude 2-mercapto arylene thiazole with a hot aqueous solution containing from about 1 to about 1.5 equivalents of a sodium salt selected from the bicarbonates and the carbonates until substantially all of the 2-mercapto arylene thiazole is dissolved and separating the undissolved material from the solution.

6. The method of purifying crude 2-mercapto arylene thiazoles of the benzene and naphthalene series containing tarry materials which comprises treating the crude 2-mercapto arylene thiazole with a hot aqueous solution containing from about 1 to about 1.5 equivalents of a sodium salt selected from the bicarbonates and the carbonates, boiling the mixture until substantially all of the 2-mercapto arylene thiazole is dissolved, and separating the undissolved material from the solution.

7. The method of purifying crude 2-mercapto arylene thiazoles of the benzene and naphthalene series containing tarry materials which comprises treating the crude 2-mercapto arylene thiazole with a hot aqueous solution containing from about 1 to about 1.5 equivalents of sodium bicarbonate until substantially all of the 2-mercapto arylene thiazole is dissolved, and separating the undissolved material from the solution.

8. The method of purifying crude 2-mercapto arylene thiazoles of the benzene and naphthalene series containing tarry materials which comprises treating the crude 2-mercapto arylene thiazole with a hot aqueous solution containing from about 1 to about 1.5 equivalents of sodium bicarbonate, boiling the mixture until substantially all of the 2-mercapto arylene thiazole is dissolved, and separating the undissolved material from the solution.

9. The method of purifying crude 2-mercapto benzo thiazole containing tarry materials which comprises treating the crude 2-mercapto benzo thiazole with a hot aqueous solution containing from about 1 to about 1.5 equivalents of an alkali metal salt selected from the bicarbonates and the carbonates until substantially all of the 2-mercapto benzothiazole is dissolved, and separating the undissolved material from the solution.

10. The method of purifying crude 2-mercapto benzo thiazole containing tarry materials which comprises treating the crude 2-mercapto benzo thiazole with a hot aqueous solution containing from about 1 to about 1.5 equivalents of an alkali metal salt selected from the bicarbonates and the carbonates, boiling the mixture until substantially all of the 2-mercapto benzo thiazole is dissolved, separating the undissolved material from the solution.

11. The method of purifying crude 2-mercapto benzo thiazole containing tarry materials which comprises treating the crude 2-mercapto benzo thiazole with a hot aqueous solution containing from about 1 to about 1.5 equivalents of an alkali metal bicarbonate, boiling the mixture until substantially all of the 2-mercapto benzo thiazole is dissolved, separating the undissolved material from the solution.

12. The method of purifying crude 2-mercapto benzo thiazole containing tarry materials which comprises treating the crude 2-mercapto benzo thiazole with a hot aqueous solution containing from about 1 to about 1.5 equivalents of a sodium salt selected from the bicarbonates and the carbonates, boiling the mixture until substantially all of the 2-mercapto benzo thiazole is dissolved, separating the undissolved material from the solution.

13. The method of purifying crude 2-mercapto benzo thiazole containing tarry materials which comprises treating the crude 2-mercapto benzo thiazole with a hot aqueous solution containing from about 1 to about 1.5 equivalents of sodium bicarbonate, boiling the mixture until substantially all of the 2-mercapto benzo thiazole is dissolved and separating the undissolved material from the solution.

14. The method of purifying crude 2-mercapto naphtho thiazole containing tarry materials which comprises treating the crude 2-mercapto naphtho thiazole with a hot aqueous solution containing from about 1 to about 1.5 equivalents of sodium bicarbonate, boiling the mixture until substantially all of the 2-mercapto naphtho thiazole is dissolved and separating the undissolved material from the solution.

IRA WILLIAMS.
BERNARD M. STURGIS.